No. 770,811. Patented September 27, 1904.

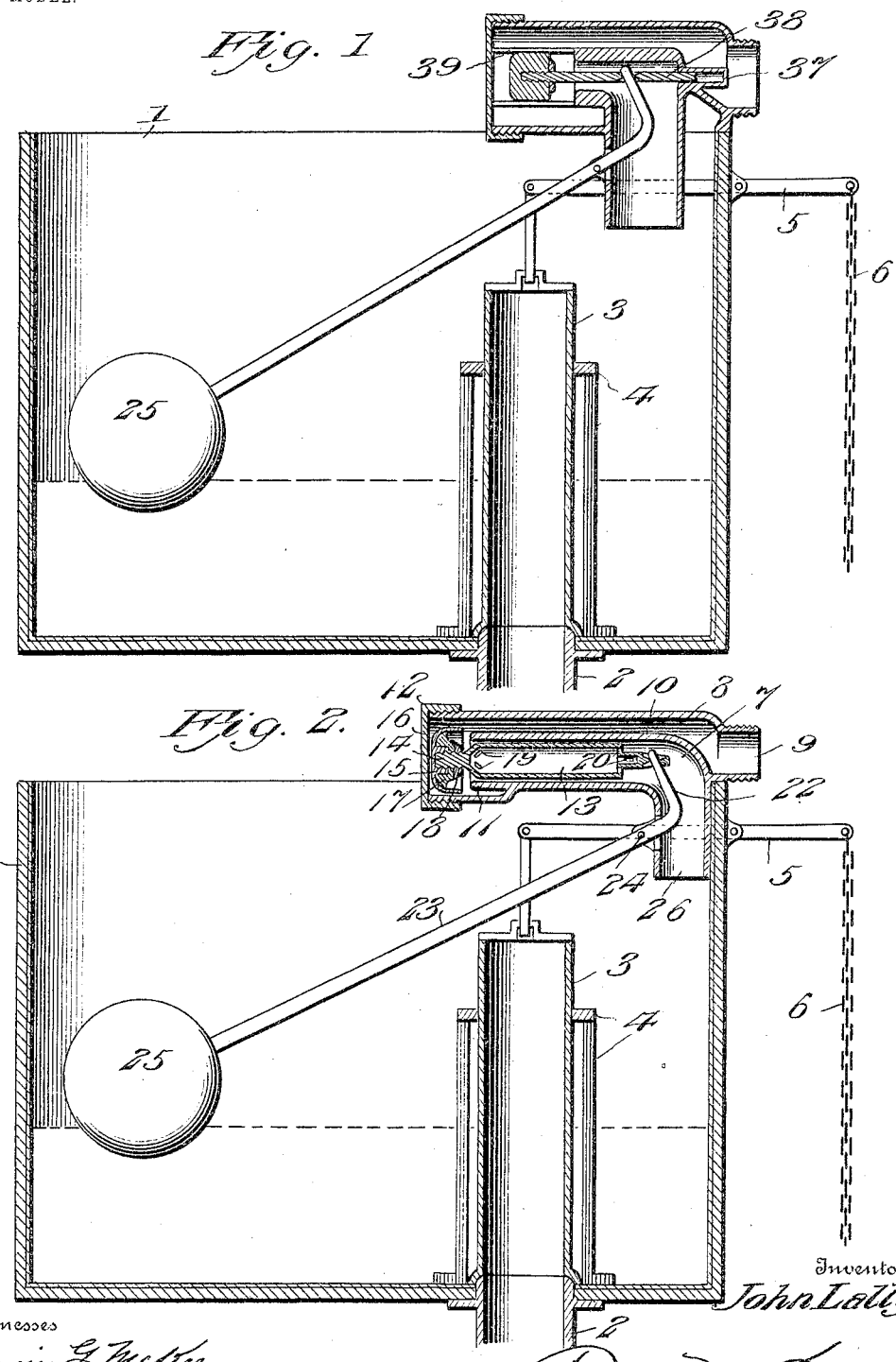

UNITED STATES PATENT OFFICE.

JOHN LALLY, OF WALTHAM, MASSACHUSETTS.

VALVE.

SPECIFICATION forming part of Letters Patent No. 770,811, dated September 27, 1904.

Application filed June 3, 1903. Serial No. 159,833. (No model.)

*To all whom it may concern:*

Be it known that I, JOHN LALLY, a citizen of the United States, residing at Waltham, in the county of Middlesex and State of Massachusetts, have invented a certain new and useful Valve, of which the following is a specification, reference being had therein to the accompanying drawings.

This invention relates to valves for flushing apparatus, the principal object of the invention being to provide, in connection with a suitable tank, a valve for admitting water to the tank, said valve and its casing being so constructed and related to each other that the pressure of the water contained in a portion of the valve-casing operates by its pressure to hold the valve normally seated and closed, thereby cutting off the supply of water to the tank until the valve is forcibly unseated or opened by a mechanical device specially provided for that purpose.

With the above and other objects in view the invention consists in the novel construction, combination, and arrangement of parts, as hereinafter fully described, illustrated, and claimed.

In the accompanying drawings, Figure 1 is a vertical sectional view of a flushing apparatus constructed in accordance with one embodiment of the present invention. Fig. 2 is a similar view showing the preferred form of admission-valve.

Like reference-numerals designate corresponding parts in both figures of the drawings.

Under the preferred embodiment of this invention as shown in Fig. 2 resort is had to a tank 1 of any suitable size or description, provided with a flushing-pipe 2, leading downward from the bottom thereof and normally closed and controlled by a hollow cylindrical flushing-valve 3, which is adapted to move up and down in a valve-cage 4, contained within the tank, as shown, said cage serving to guide the flushing-valve in its movements and insure the proper seating of the same. Under the arrangement shown in Figs. 1 and 2 the flushing-valve 3 is operatively connected with a flushing-valve lever 5, to the outer end of which is connected an operating chain or connection 6.

At or near the top of the tank is located a water-admission valve which comprises a valve-casing having inner and outer chambers, the inner chamber, 7, constituting the valve-chamber proper, while the outer chamber, 8, I term a "water-pressure" chamber, to which water is admitted directly under pressure through the entrance 9, to which the water-service pipe (not shown) is connected. The valve-casing as a whole is substantially cylindrical, the cylindrical inner valve-chamber 7 being partially surrounded by the outer water-pressure chamber 8 and the two chambers being divided from each other by an intervening inner wall 10. This inner wall is projected at one end to form a cylindrical extension or valve-seat 11, the edge of which is adapted to meet the head of the valve and form a tight closure between the water-pressure chamber and the valve-chamber. The end of the valve-casing is closed by means of a cap 12, which is screwed thereon, as shown in both figures.

The valve in the preferred embodiment of this invention comprises a tubular cylindrical body 13, having at one end a reduced threaded shank 14, which is received in an internally-threaded boss 15, projecting centrally from the inside of the valve-head 16, said valve-head being cup-shaped, as shown in Figs. 2 and 3, and of sufficient size to embrace the cylindrical extension or valve-seat 11 when the valve is closed. Within the cup-shaped valve-head 16 is placed a packing-washer 17, the same being held in place by means of a nut 18, threaded upon the shank 14 of the valve. The packing-washer 17 when brought to bear against the valve-seat forms a liquid-tight joint and cuts off the admission of water to the valve-chamber. At the same end of the valve the latter is provided with inlet-ports 19, so that the water may pass through the tubular body of the valve and escape through outlet-ports 20 at the opposite end of the valve-body. At that end of the valve-body containing the outlet-ports 20 the valve is provided with a longitudinal extension 21, having a transverse slot therethrough to receive the short arm 22 of an elbow-lever 23, fulcrumed at 24 on the valve-casing and constituting the admission-valve-operating lever, by the vibration of which the valve is opened or closed. In Fig. 2 the operating-lever 23 is provided at the outer end of its longer arm with a float 25, which rises and falls with the level of the water in the tank, so that when the water reaches a predetermined level in the tank the lever 23 acts to close the valve, and the pressure of the water in the chamber 8 acts to hold the valve firmly seated by occupying the space between the cup-shaped head of the valve and that end of the valve-casing which is closed by the cap 12.

26 designates the outlet or discharge of the valve-casing, which empties directly into the tank 1.

Under the arrangement shown in Fig. 2 the water-admission valve and the flushing-valve are not coupled in any way, and therefore the admission-valve is controlled automatically by the float 25 and the operating-lever 23, which operate to close the valve when the water rises, and the water-pressure in the outer chamber of the valve-casing, which acts to hold the valve closed. When the tank is emptied by opening the flushing-valve 3, the weight of the float and operating-lever are sufficient to unseat the valve and overcome the pressure of the water in the outer chamber of the valve-casing, thus allowing the tank to be refilled.

The arrangement shown in Fig. 1 involves exactly the same principle as that shown in Fig. 2, the admission-valve differing from Fig. 2 in that the valve-chamber is provided with a reduced longitudinal extension 37, in which the extended solid stem 38 of the valve works for guidance. The opposite end of the valve-chamber is in the form of an open-work cage 39, which readily admits the water to the valve-chamber when the valve is opened and which serves as a guide for the valve as it is opened and closed. Fig. 1 illustrates the admission-valve in its simplest and cheapest form; but the construction shown in Fig. 2 is preferred.

Having thus described the invention, what I claim as new, and desire to secure by Letters Patent, is—

1. In a flushing apparatus, a water-admission valve comprising a double-walled casing embodying an inner cylindrical valve-chamber and an outer water-pressure chamber encircling the same, the valve-chamber being provided with a cylindrical extension at one end forming the valve-seat, a hollow cylindrical valve-body working within and filling the inner valve-chamber and provided with inlet and outlet ports at opposite ends and also having a cup-shaped head at one end adapted to fit over and inclose said extension, and a valve-operating lever engaging the opposite end of the valve-body, substantially as described.

2. In a flushing apparatus, a water-admission valve comprising a double-walled casing embodying an inner cylindrical valve-chamber and an outer water-pressure chamber encircling and eccentric to the valve-chamber and extending at one end beyond the same, a hollow cylindrical valve-body working within and filling the inner valve-chamber and provided with inlet and outlet ports at opposite ends, a cup-shaped valve-head on one end of the valve-body adapted to fit over and inclose the extremity of the inner valve-chamber and an operating-lever engaging the opposite end of the valve-body, substantially as described.

In testimony whereof I affix my signature in presence of two witnesses.

JOHN LALLY.

Witnesses:
JOHN H. BROWN,
JOHN L. SANDERSON.